T. J. WADDELL.

FERTILIZER DISTRIBUTER.

APPLICATION FILED NOV. 7, 1906.

Reissued July 27, 1909.

12,997

4 SHEETS—SHEET 1

Witnesses:

K. K. Keffer.

J. B. Smurtney

Inventor:

Thos. J. Waddell.

by Quirk & Lane Att'ys.

ANDREW. B. GRAHAM CO., PHOTO-LITHOGRAPHERS, WASHINGTON, D. C.

T. J. WADDELL.

FERTILIZER DISTRIBUTER.

APPLICATION FILED NOV. 7, 1906.

Reissued July 27, 1909.

12,997.

4 SHEETS—SHEET 2.

*Witnesses.*

K. K. Keffer.

J. B. Smutney.

*Inventor.*

Thos. J. Waddell.

by Owen & Lane, Att'ys

ANDREW B. GRAHAM CO., PHOTO-LITHOGRAPHERS, WASHINGTON, D. C.

T. J. WADDELL.

FERTILIZER DISTRIBUTER.

APPLICATION FILED NOV. 7, 1906.

Reissued July 27, 1909.

12,997.

4 SHEETS—SHEET 3.

Witnesses

K. K. Kiffer.

J. B. Smutney.

Inventor.

Thos. J. Waddell.

by Owen & Lane Att'ys.

ANDREW B. GRAHAM CO., PHOTO-LITHOGRAPHERS, WASHINGTON, D. C.

T. J. WADDELL.

FERTILIZER DISTRIBUTER.

APPLICATION FILED NOV. 7, 1906.

Reissued July 27, 1909.

12,997.

4 SHEETS—SHEET 4.

Witnesses

K. H. Kaffer.

J. B. Smutney

Inventor.

Thos. J. Waddell.

by Owen & Langstaff

ANDREW B. GRAHAM CO., PHOTO-LITHOGRAPHERS, WASHINGTON, D. C.

UNITED STATES PATENT OFFICE.

THOMAS J. WADDELL, OF PHILBROOK, MONTANA, ASSIGNOR, BY DIRECT AND MESNE ASSIGNMENTS, OF THREE-TENTHS TO CLARENCE M. GOODELL, OF PHILBROOK, MONTANA, AND ONE-TENTH TO L. C. WOOD AND ONE-TENTH TO C. C. DAVID, OF ALDEN, IOWA.

FERTILIZER-DISTRIBUTER.

No. 12,997. Specification of Reissued Letters Patent. Reissued July 27, 1909.

Original No. 775,357, dated November 22, 1904, Serial No. 174,506. Application for reissue filed November 7, 1906. Serial No. 342,442.

*To all whom it may concern:*

Be it known that I, THOMAS J. WADDELL, a citizen of the United States, residing at Philbrook, in the county of Fergus and State of Montana, have invented new and useful Improvements in Fertilizer-Distributers, of which the following is a specification.

This invention relates to improvements in fertilizer distributers; and the objects are to simplify and improve the existing art by providing a machine of the class named for the purposes intended which is of simple construction and effective in operation, which may be adjusted or regulated expeditiously.

With these and other objects and advantages in view the invention consists in the construction and arrangement of the several parts, which will be more fully hereinafter described and claimed.

Figure 1:
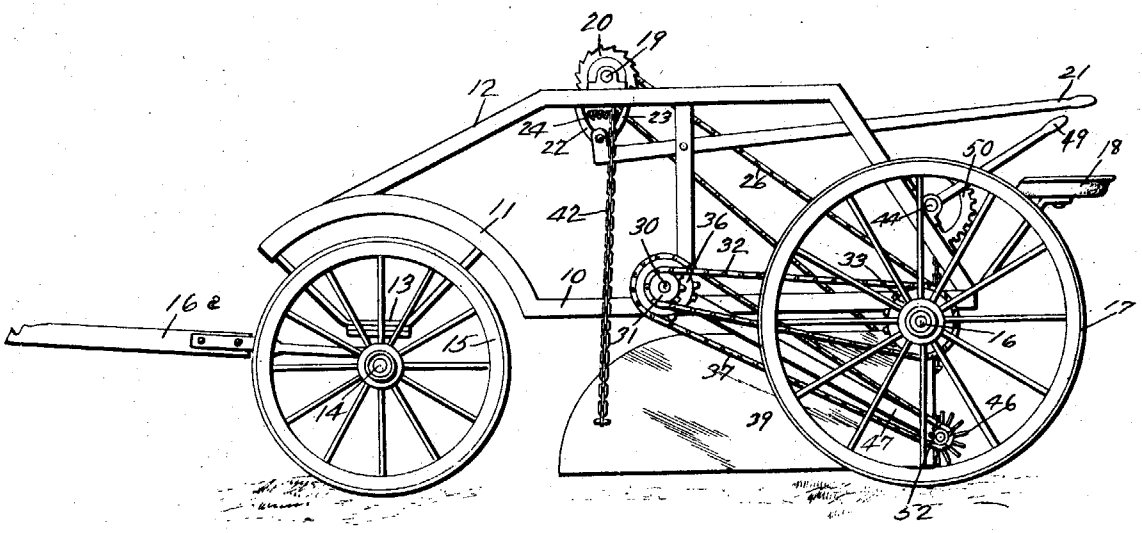
Figure 2:
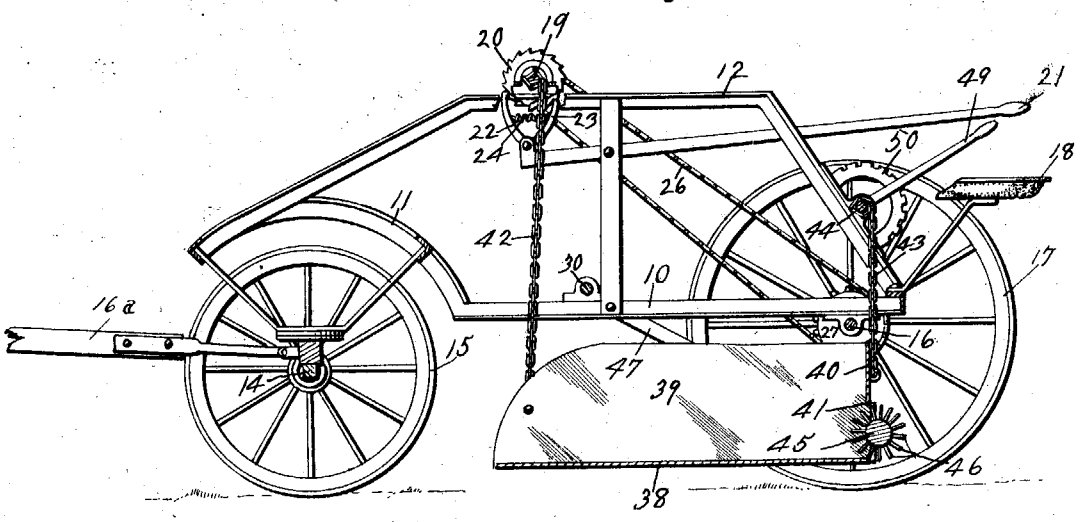
Figure 3:
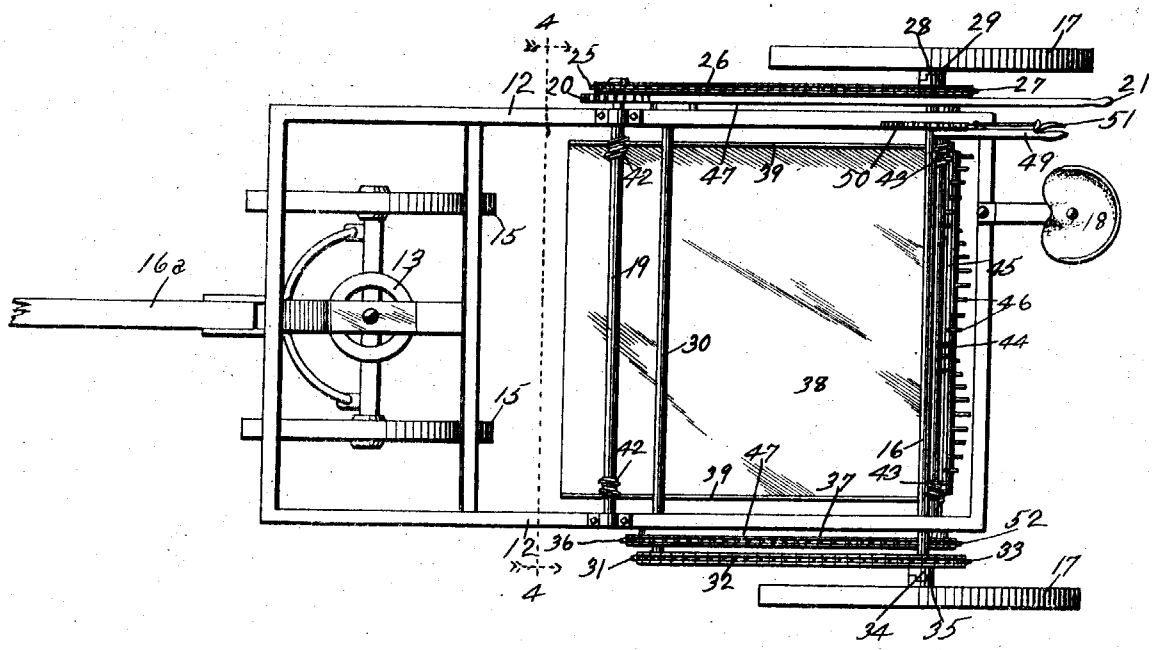
Figure 4:
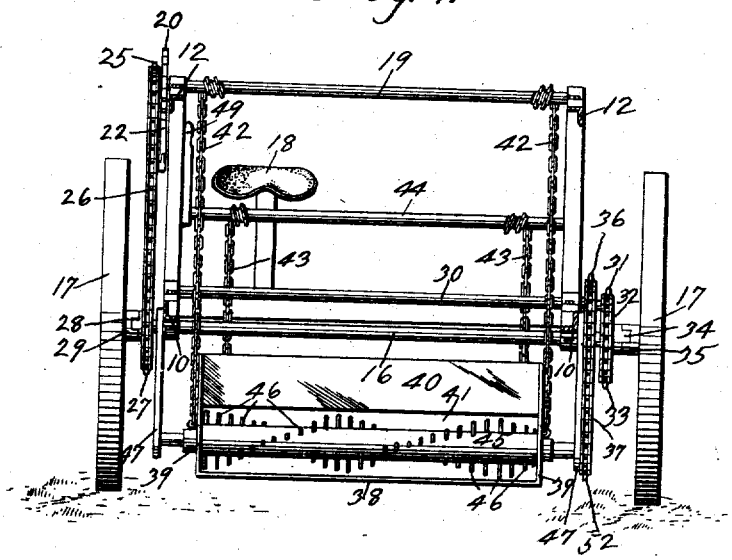
Figure 5:
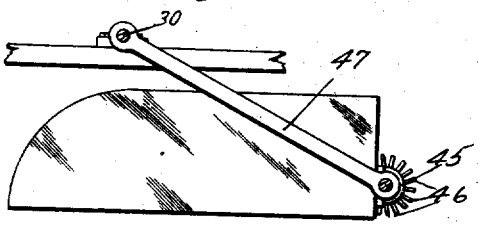

In accompanying drawings, Figure 1 is a side elevation of a machine embodying the features of the invention. Fig. 2 is a longitudinal vertical section thereof. Fig. 3 is a top plan view of the same. Fig. 4 is a transverse vertical section on the line 4—4, Fig. 3. Fig. 5 is a side elevation of the receptacle, showing the means for movably supporting the same from the main frame.

Similar numerals of reference are employed to indicate corresponding parts in the several views.

The main frame is preferably made of structural metal and comprises a horizontally arranged frame 10 with forward arches 11 thereon and a superstructure 12 above the frame 10 and 11. Under the arches 11 is a turn table 13 resting upon the forward axle 14 on which the forward wheels 15 are mounted. A tongue 16[a] is connected with said axle. At the rear of the frame 10 is a rear axle 16 rotatably mounted and provided with the traction wheels 17. A driver's seat 18 is secured to the frame 10 near its rear end and preferably adjacent to its right side, as shown in Fig. 3. Supported on the superstructure 12 is a transversely extending winding spindle 19 having fixed thereon the ratchet wheel 20 near one end. Fulcrumed to a part of the superstructure 12 is an operating lever 21 having pivoted to its forward end two pawls 22 and 23 arranged to engage opposite sides of the ratchet wheel 20. A contractible coil spring 24 is connected with these pawls to yieldingly hold them in operative contact with the ratchet wheel, one of said pawls being shaped to pull downwardly upon the forward portion of the ratchet wheel and the other to push upwardly on the rear portion as clearly shown in Fig. 2. In this way the said shaft may be rotated manually by an operator on the driver's seat. I have also provided for rotating said shaft 19 by means of power derived from the rear axle 16 as follows: Fixed to the shaft 19 adjacent to the ratchet wheel 20 is a sprocket wheel 25 connected by a sprocket chain 26 with a sprocket wheel 27 which is rotatably mounted upon the rear axle 16 and which is provided with a clutch member 28 designed to coact with a mating clutch member 29 on the hub of the adjacent rear wheel 17. A suitable lever mechanism may be provided to throw the sprocket wheel with its clutch member 24 into or out of engagement with the coacting clutch member 28 which lever device has not been shown because it is an obvious attachment and one well understood in the art of clutches.

Mounted at about the central portion of the frame 10 is a shaft 30 having thereon a small sprocket wheel 31 connected by a sprocket chain 32 with a sprocket wheel 33 on the rear axle 16. This sprocket wheel 33 is rotatably mounted on the rear axle and is provided with a clutch member 34 to engage a coacting clutch member 35 on the adjacent rear wheel 17, said sprocket wheel 33 may be operated to have its clutch member thrown into and out of engagement with the clutch member 35 by means of a suitable lever not shown. When said clutches are in engagement, the shaft 30 will be driven by the rear axle. On the shaft 30 is a large sprocket wheel 36 which is connected by means of a sprocket chain 37 with a sprocket wheel on the spreading cylinder, as hereinafter set forth.

The receptacle is composed of a bottom 38, sides 39 and a rear end 40, which latter has an opening 41 formed therein and extending from the bottom about half way from the top of the rear end. This receptacle is preferably made of metal and is shaped substantially like an ordinary scraper It is supported on the frame as follows: Attached to the forward end of the receptacle are the chains 42 which extend straight upwardly and are fixed to and wound upon the shaft 19. At its rear end the chains 43 are attached at the lower ends to the end piece 40 and they extend upwardly and are fixed to and wound upon a shaft 44 which is supported on the superstructure 12. The said receptacle is also provided at its rear end with a spreading cylinder 45 having the cylinder teeth 46, the said cylinder normally standing in the opening between the bottom 38 and the end 40. For holding the receptacle against movement longitudinally of the frame, I have provided two arms 47 having their forward ends pivotally mounted on the shaft 30 and their rear ends mounted on the extended ends of the spreading cylinder 45 so that when the receptacle is used as a scraper for gathering material, the said arms form a rigid brace to hold it to its work. I have previously described the means for raising and lowering the front end of the receptacle. It is not necessary to raise and lower the rear end to as great a degree as the front end and I have provided the following means for adjusting the rear end of the receptacle.

The numeral 49 indicates a lever fixed to the shaft 44 and disposed in position adjacent to the driver's seat. Obviously by raising and lowering this lever, the chain 43 will be wound upon the shaft 44 and the rear end of the receptacle will be raised or lowered thereby. For securing the lever 49 in any position of its adjustment, I have provided a sector 50 on the superstructure 12 and a pawl 51 on the lever 49 to engage and coact with said sector in the ordinary way.

Fixed to the shaft of the spreading cylinder is a sprocket wheel 52 around which the sprocket chain 37 is passed so that when the shaft 30 is rotated, the spreading cylinder will be rotated thereby.

In practical use and assuming that it is desired to load the receptacle, the levers 21 and 49 are manipulated to bring the bottom of the receptacle approximately to the ground level. Then the machine is advanced and the receptacle will serve as a scraper to gather the material and carry it within the receptacle. The braces 47 serve to firmly support the receptacle in this position. When the receptacle has been loaded, the operator may raise its forward end in either of two ways. He may do it manually by reciprocating the lever 21 which will act upon the ratchet wheel 20 and shaft 19, as required to wind the chains 42 upon the shaft until its forward end is at the proper elevation, or if it is desired, he may cause the sprocket wheel 27 to have its clutch member thrown into engagement with the clutch member 29 so that the shaft 19 will be rotated in unison with the rear axle 16 by means of the sprocket device consisting of the chain 26, and the sprocket wheels 25 and 27 and when the receptacle is sufficiently elevated the sprocket wheel 27 is moved back to its inoperative position. The rear end of the receptacle is elevated when desired by the operator grasping the lever 49 and raising it so that the chains 43 will be wound upon the shaft 44. The lever 49 may then be held in any position of its adjustment by the pawl 51 engaging the sector 50. When it is desired to spread the material carried by the receptacle, the forward end of the receptacle is tilted to such an angle that the material contained therein will slide by gravity toward the rear end of the receptacle. Then the sprocket wheel 33 is moved to position so that its clutch member will engage the clutch member 35 on the rear axle, thus causing the spreading cylinder to be rotated through the sprocket device consisting of the chains 32 and 37 and the sprocket wheels with which they are connected. During the operation of spreading the incline of the receptacle may be varied to suit the requirements so that the material will gradually move toward the discharge end of the receptacle where it will be distributed by the spreader in the ordinary way.

One of the important features of my invention is the arrangement of the sprocket device consisting of the chains 32 and 37 and their sprocket wheels by which the following result may be accomplished: The chains are held taut and in position for effective operation, both when the rear of the receptacle is at its lower limit of movement and when it is at its upper limit of movement and at all intermediate positions. In a machine of this kind it is essential that the driving of the spreading cylinder be done by means of power from the axle of the traction wheels and since the position of the spreading cylinder varies in its different adjustments with relation to the position of the rear axle, it is necessary to provide some means for connecting the rear axle and the spreading cylinder so that the latter may be driven by the former when the spreading cylinder is at any position of its adjustment.

It is apparent, of course, that I am not limited to the precise details of construction and organization of parts herein shown and described.

Having thus described the invention, what is claimed as new is—

1. In a device of the class described, the combination of a frame, supporting wheels for the frame, a scraper, adjustable means for supporting the scraper, said means being capable of moving the scraper to, and supporting it in, either a forwardly inclined position for scraping up material, a substantially horizontal position for carrying material, or a rearwardly inclined position for discharging material, a spreader arranged at the discharge end of the scraper, and means for operating the spreader when the discharge end of the scraper is in different positions of elevation.

2. In a fertilizer distributer, the combination of a frame, supporting wheels for the frame, a winding spindle supported on the upper portion of the frame, ratchet and sprocket wheels thereon, mechanism interposed between the supporting wheels and said sprocket wheel for rotating the spindle, an operating lever, push and pull dogs connected with it to engage the ratchet wheel, a scraper, means for connecting the scraper with said spindle whereby its forward end may be raised or lowered by the spindle, and manually operated means for raising and lowering the rear end of the scraper, a spreader at the discharge end of the scraper, and means operated by power from the supporting wheels for operating said spreader.

3. In a fertilizer distributer, the combination of a wheel frame, a receptacle adjustably suspended under the frame and having a fully open front portion and a rear end open from the bottom upwardly and having an inclosure above said opening, a spreading device mounted in the rear end of the receptacle below said inclosure, and mechanism for rotating the spreading device and means for retaining the mechanism in operative position when the receptacle is adjusted.

4. In a fertilizer distributer, the combination of a frame supported on axles having wheels, a winding shaft held on the upper part of the frame, a spindle also supported on the frame, means for operating the said spindle and shaft, a receptacle held under the frame by flexible means attached to the shaft and to the spindle, a spreader rotatably mounted in the rear extremity of the receptacle, and mechanism operatable by the rear axle for rotating the spreader.

5. In a device of the class described, the combination of a frame, wheel axles on which said frame is supported, a receptacle suspended from the frame, manually operated means for adjusting the receptacle, mechanically operated means for adjusting the receptacle by power from one of the wheel axles, a rotating spreader in the receptacle and mechanism operated by one of the wheel axles for rotating the spreader.

6. In a device of the class described, the combination of a frame, supporting wheels for the frame, a receptacle carried by the frame and movable up and down relative to the supporting wheels and means for elevating the receptacle by power from a supporting wheel, said means comprising a shaft, chains fixed to and wound upon the shaft and connected with the receptacle, a gearing device connected with the shaft and with one of the supporting wheels, a spreader in the receptacle and means for operating the spreader by power from the supporting wheel.

THOMAS J. WADDELL.

Witnesses:
F. E. WOLF,
GORDON O. SHAFER.